US006372378B1

(12) United States Patent
Warner et al.

(10) Patent No.: US 6,372,378 B1
(45) Date of Patent: Apr. 16, 2002

(54) BATTERY CASING FOR ARMORED VEHICLES

(75) Inventors: Joseph G. Warner, Sterling Heights; John W. Monroe, Warren, both of MI (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 97 days.

(21) Appl. No.: 09/613,056

(22) Filed: Jun. 30, 2000

(51) Int. Cl.[7] ............................................. H01M 10/50
(52) U.S. Cl. ........................ 429/120; 429/99; 429/62; 429/96; 429/98; 429/100; 429/82; 429/53
(58) Field of Search .......................... 429/99, 100, 62, 429/120, 96, 98, 82, 53

(56) References Cited

U.S. PATENT DOCUMENTS 5,639,571 A * 6/1997 Waters et al. ................. 429/71

* cited by examiner

Primary Examiner—Gabrielle Brouillette
Assistant Examiner—Angela J. Martin
(74) Attorney, Agent, or Firm—David L. Kuhn; Gail S. Soderling; Clifford C. Carter

(57) ABSTRACT

An improved battery case for armored vehicles the case having an inlet and outlet, the case halving means that opens the case for airflow when the interior temperature of the case reaches a predetermined value. The case is further insulated so it will minimize the transfer of heat from the surrounding engine components and armor plate.

4 Claims, 1 Drawing Sheet

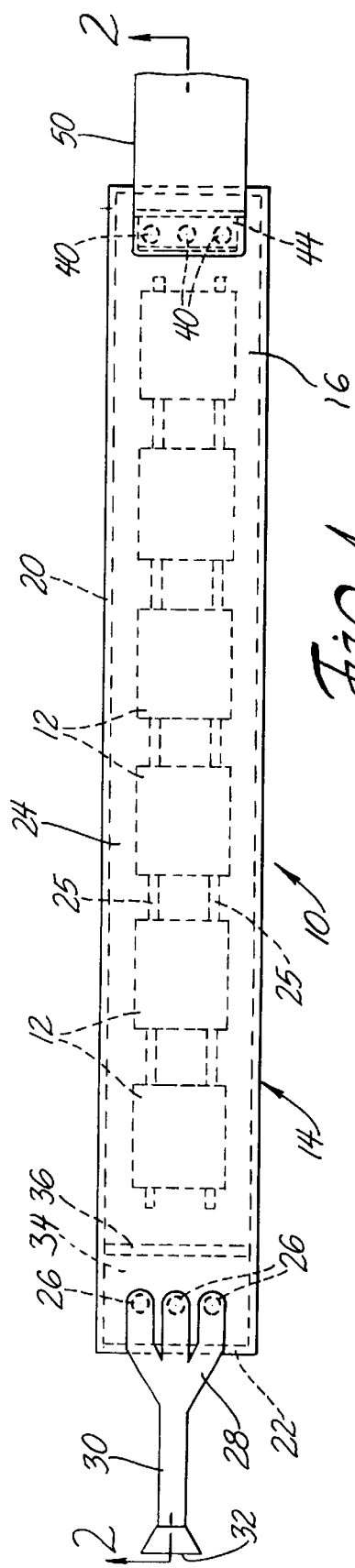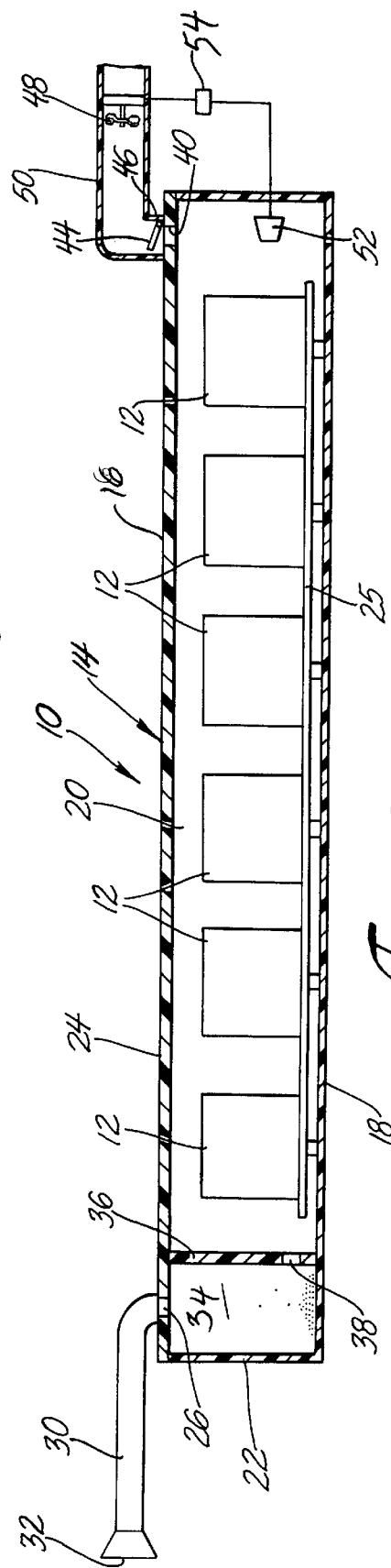

BATTERY CASING FOR ARMORED VEHICLES

GOVERNMENT INTEREST

The invention described here may be made, used and licensed by and for the U. S. Government for governmental purposes without paying us any royalty.

BACKGROUND OF THE INVENTION

1. Field of the Invention

In one aspect this invention relates to storage cases for batteries. In a further aspect this invention relates to a battery casing for extending armored vehicle battery life.

2. Prior Art

In general ground vehicles have one or more storage batteries as a means to store electrical energy for starting the vehicle and operating auxiliary equipment when the vehicle's prime mover is turned off. Armored combat type vehicles present unusual and extreme problems for storage batteries. Such vehicles must maintain hull or outer structure integrity in order to provide protection against various projectiles. Thus, the use of openings in the hull structure must be minimized both in number and size. Also the structure of combat vehicles results in a closed exterior that admits to little or no airflow by convection through the hull or engine compartment. In addition, military vehicles are exposed to weather extremes that severely stress the components while failure can create casualties.

In armored vehicles exposed to desert conditions the sun will heat the vehicle's armor to temperatures in the 150 to 180 F. range which in turn will raise the battery temperature to a similar range even when not operating. When operating and the batteries are working or being charged, the battery's temperatures will climb still higher. The result is water evaporates from the battery fluid and diminishes the battery capacity and efficiency. During the most severe high temperature ambient conditions it becomes necessary to add distilled water to the battery on a daily basis since the battery temperature will approach the boiling point of water with a resulting very high rate of evaporation. Because the batteries are under the armor shell they are difficult to service and the possibility of failure is raised. In addition to high ambient temperatures, combat vehicles are exposed to large quantities of air borne dust. Any battery ventilation system should account for the dusty conditions and have means for particle removal, preferably in a passive mode.

The location of the batteries creates yet a further problem. Because the batteries are located under the armor shell, the preference is to site them near the engine which in turn exposes them to the effects of heat generated by the prime mover. Experience has been that in tanks operating under desert environments, the average life of a battery will be about one year due to the constant evaporation and resulting use under less than optimal conditions. This short life span results in high replacement and maintenance costs. In addition, to increased cost, the decrease in readiness represents an increase in risk to the troops.

It would be desirable to have a battery supporting and protecting structure that will help maintain the batteries near the ambient temperature even when the surrounding portion of the vehicle gets overly heated in order to save battery life and increase readiness. It would be further desirable to insulate the battery supporting structure to minimize heat transfer from the surrounding area into the battery support during prime mover operation. Still further it would be desirable to have a structure that will have increased ventilation as a function of temperature in the battery storage area. Yet another desirable feature would be means to remove a substantial portion of any dust or other air born matter entering the ventilation system. Battery compartment ventilation minimizes dust accumulation, lowers battery temperature, and evacuates explosive hydrogen gas created during battery charging.

SUMMARY OF THE INVENTION

Briefly the present invention is directed to a battery storage system for holding and protecting the storage batteries used in an armored combat vehicle. The storage system includes a battery case having a top, bottom, sides and ends so as to form an enclosure that holds the batteries in a spaced configuration within the case. The sides and top of the case are insulated so as to minimize the thermal effects caused by heat from the surrounding engine components and armor materials. A supporting grid supports the batteries apart from the case bottom to permit the circulation of air under and around the batteries for cooling purposes. The case has a thermally controlled valve member located near a first end of the case on the case's top surface. A conduit connects a second end of the battery case distal the valve member to an inlet on the vehicle's surface that allows the entry of ambient air. A solids entrapping means is located between the battery box and the inlet, the solid entrapping means being adapted to passively separate solids from the flowing air prior to entry of the cooling air into the case.

In a battery storage box according to this invention when the battery case temperature exceeds a predetermined value the valve opens allowing ambient air to flow through the conduit and around the batteries reducing their temperature. The cooling air first passes through the solids entraining means to minimize the solids that enter the battery enclosure.

BRIEF DESCRIPTION OF THE DRAWING

In the accompanying drawing:

FIG. 1 is top view of one embodiment of this invention; and

FIG. 2 is a sectional view taken along the line 2—2 of FIG. 1.

DETAILED DESCRIPTION

Referring to the accompanying drawing in which like numerals refer to like parts and initially to FIG. 1, a battery storage system 10 is designed to hold and protect a plurality of storage batteries 12 used as part of an electrical system (not shown) of an armored combat vehicle. The storage system includes a battery case 14 having a top 16, bottom 18, sides 20 and ends 22 so as to form an enclosure that holds the batteries 12 in a spaced configuration within the case 14. The sides 20 and top 16 of the case 14 are formed with an thermally insulating layer 24 that will minimize the heat transfer from the engine compartment that houses a large prime mover such as a 1500 horsepower turbine or diesel engine. Such engines generate a large amount of heat in the engine compartment that in turn stresses the batteries 12. The insulation layer 24 also resists heat transfer from surrounding armor material that can absorb large amounts of heat when exposed to direct sun such as in desert environments.

The case is formed with a supporting grid 25 disposed along the bottom 18 of the case to support the batteries in a spaced relationship to the case bottom. This configuration permits the circulation of air under the batteries and the sides 20 of the case are spaced apart from the sides of the batteries 12 so as to allow free circulation of air around the batteries for cooling purposes.

The top surface 16 of the case 14 has a plurality of inlet apertures 26 formed in the surface near one end. The apertures 26 are connected to a manifold 28 that is in turn connected to a duct 30 with an inlet 32 located at the armored surface of the vehicle so as to admit ambient air. Air traversing the conduit 30 will pass through manifold 28 and apertures 26 into a particle separation chamber 34 formed on one end of the case 14. The particle separation chamber 34 is formed by one battery case end 22 part of the top 16 and sides 20, and bottom 18 of the case with the last side formed by a baffle 36. The baffle 36 has an opening 38 located at a position above the bottom 18 of case 14 so as to form a shallow retaining pocket at the lower end of the chamber. Dirt and dust carried by the ambient air as it traverses the manifold 28 will tend to settle from the flow of air as the air changes direction passing through chamber 34. The dust and dirt will collect in the retention pocket 39 and can be removed when periodic maintenance is performed on the battery case. Cooling air enters the remainder of the battery case 10 through the opening 38 where it circulates freely around the batteries 12.

The top 16 of casing 14 distal the particle separation chamber 34 has a second plurality of exhaust apertures 40 formed in end of the top distal the inlet apertures 26. Flow through the exhaust apertures 40 is controlled by means of a bimetallic cover 44. The bimetallic cover 44 is formed so to lie essentially flat on the upper surface of case top 16 when the temperature of the battery case 10 is below a certain predetermined operating temperature e.g. 100 F. As the temperature rises above the set point, the cover 44 will open and allow cooling air to flow through the battery case 14. As the temperature continues to rise, the cover 44 will open further to allow greater cooling capacity as the temperature rises.

As a further feature, the system can be enhanced as shown in FIG. 1 where the exhaust cover 44 and apertures 40 are surrounded by an exhaust manifold 46 that has an associated fan 48 located within an exhaust duct 50. The fan 48 is controlled by a sensing element 52, which will signal a control box 54 the control box activating the fan 48 to cause the fan to operate when the temperature measured by sensing element 52 in the battery case 14 reaches a level where additional cooling air is indicated.

Various alterations and modifications will become apparent to those skilled in the art without departing from the scope and spirit of this invention and it is understood this invention is limited only by the following claims.

What is claimed is:

1. A battery storage system for holding and protecting the storage batteries used in an armored combat vehicle within an engine compartment of the vehicle including:
    a battery case having a top, bottom, sides and ends which form an enclosure which holds the batteries in a spaced configuration within the case, the sides and top of the case being covered with an insulating layer that restricts thermal transfer from the surrounding engine components and armor material;
    a supporting grid disposed between the batteries and the case bottom to permit the circulation of air under and around the batteries;
    a thermally controlled valve member located near a first end of the case;
    an inlet for ambient air located on the surface of the vehicle;
    a conduit connecting a second end of the battery case distal the valve member with the inlet;
    a solids entrapping means located between the battery box and the inlet adapted to separate solids from the flowing air prior to entry of the cooling air into the case;
    whereby, when the battery case temperature exceeds a predetermined value, the valve opens, allowing ambient air to flow through the conduit and around the batteries, the cooling air first passing through the solids entraining means to minimize the solids which enter the battery enclosure.

2. The battery case of claim 1 where the thermal control for the valve is a bimetallic spring.

3. The battery case of claim 1 where the solid entraining means further comprises a chamber attached to the second end of the battery case, the chamber being connected to the conduit and having a vertically disposed plenum depending downward from the upper surface of the chamber, the plenum having an opening distal the inlet so that air entering the chamber is directed downward transverse to the longitudinal axis of the battery case and thence through an opening in the plenum into the battery case parallel to the longitudinal axis of the battery case, so as to cause solids in the air stream passing through the battery case to be deposited in the chamber.

4. The battery case of claim 1 further including a fan located near the outlet, the fan being responsive to the temperature within the battery case so as to create a negative pressure within the battery case when the interior temperature exceeds a predetermined maximum.

\* \* \* \* \*